May 31, 1960

G. B. B. CHAPLIN 2,939,047

TRANSISTOR CIRCUIT

Filed Feb. 26, 1957

United States Patent Office 2,939,047

Patented May 31, 1960

2,939,047

TRANSISTOR CIRCUIT

George Brian Barrie Chaplin, Abingdon, England, assignor to the United Kingdom Atomic Energy Authority, Patents Branch, Bedford Chambers, London, England Filed Feb. 26, 1957, Ser. No. 642,607

7 Claims. (Cl. 315—84.6)

This invention relates to transistor circuits and is concerned particularly with transistor circuits suitable for driving Dekatron scaling tubes.

According to the present invention a circuit for driving a Dekatron scaling tube comprises a blocking oscillator including a transistor having transformer feedback between the collector electrode and a further electrode thereof, and means comprising a further winding on said transformer the ends whereof are connected to terminals which may be connected to the first and second guide systems of a Dekatron scaling tube, whereby first and second consecutive negative switching pulses are generated in said further winding and are applied to the said first and second guide systems respectively when the said oscillator is triggered.

To enable the nature of the invention to be more readily understood, attention is directed towards the accompanying drawings wherein.

Figures 1, 2, 3:
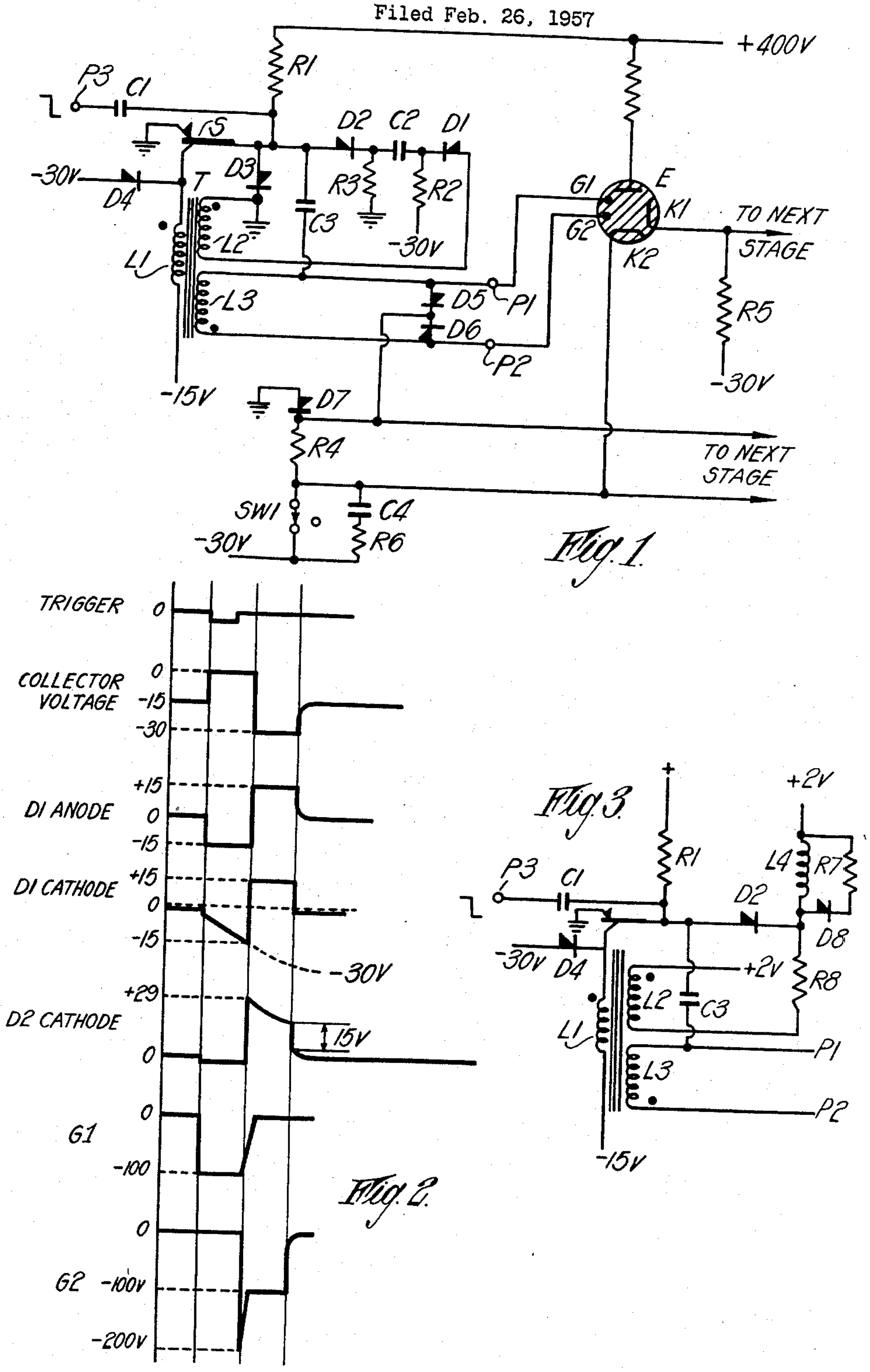
Fig. 1 is a circuit diagram of a Dekatron scaling stage including, by way of example, a circuit according to the invention.
Fig. 2 illustrates waveforms in the circuit of Fig. 1.
Fig. 3 is a circuit diagram illustrating a modification of the circuit of Fig. 1.

Referring firstly to Fig. 1, a junction transistor S having its emitter electrode earthed has its collector and base electrodes inductively coupled by means of windings L1 and L2 on a transformer T. The transistor is normally cut off by a small current fed to its base through a resistor R1 from a 400 v. positive supply. Negative trigger pulses are applied to the base through a condenser C1 connected to an input terminal P3. One end of the transformer winding L2 is connected to earth; the other is connected through a diode D1, a condenser C2, and a diode D2 to the base of the transistor. A resistor R2 is connected between the junction of D1 and C2 and a —30 v. supply; a resistor R3 is connected between the junction of D2 and C2 and earth. A diode D3 is connected between the base and earth. The collector is connected through the winding L1 to a —15 v. supply and through a diode D4 to a —30 v. supply. Windings L1 and L2 have the same number of turns.

The circuit as so far described constitutes a blocking oscillator. The transistor is normally cut off except for the $i_{co}$ current flowing in the collector. On receipt of an input pulse the collector current increases, and because of the inductive coupling the process is regenerative.

Waveforms at various points in the circuit are shown in Fig. 2. It will be seen that the collector voltage rises immediately a trigger pulse is applied to the input terminal P3 from —15 v. to 0, the anode of D1 falling a like amount because of the 1:1 transformer ratio between L1 and L2. In the cut-off state the cathode of D1 is at earth potential because of the current flowing through L2, D1 and R2. However when the anode of D1 goes to —15 v. D1 is cut-off, and C2 starts to charge through R2 towards —30 v. When the voltage across C2 is such that D1 cathode reaches —15 v., D1 again conducts, the flow of base current ceases, and the transistor turns off. The transformer overswing causes the collector to go negative, being caught at —30 v. by the diode D4. The cathode of D1 also rises by 30 v. and C2 discharges through R3. Diodes D2 and D3 restrict the positive excursions of the base. It will be seen that with fixed supply potentials the time during which the transistor conducts is determined by the time constant C2, R2.

The circuit of Fig. 1 also comprises a Dekatron scaling tube E (a type of tube well known in the art) having guide systems G1 and G2, a separate output cathode K1 connected through a resistor R5 to a —30 v. supply, and nine further interconnected cathodes, shown on Fig. 1 as K2, connected through a switch SW1 (which is spring-loaded in the closed position) to a —30 v. supply. The transformer T has a further winding L3 having about 7 times as many turns as L1 and L2, the ends of which are connected to the guide systems G1 and G2 through terminals P1 and P2 respectively as shown. A condenser C3 is connected between P1 and the transistor base. Diodes D5 and D6 are connected between P1 and P2 respectively and the cathode of a diode D7 whose anode is earthed, and through a resistor R4 and the resetting switch SW1 to a —30 v. supply.

The relevant waveforms are again shown in Fig. 2. In normal operation SW1 is closed, D7 conducts and the guides are therefore prevented by D5 and D6 from rising above earth potential. When the blocking oscillator is triggered the transistor conducts and the side of L3 connected to G1 goes to about —100 v. charging the condenser C3 in the process, the other side of L3 being held at earth potential by D6. The discharge within the tube E is thus attracted from a cathode K2, which is at —30 v., onto a guide of the guide system G1. When the transistor turns off G1 is held substantially fixed at —100 v. by C3 and so G2 falls through 200 v. to —200 v., attracting the discharge from G1. The guide currents then rapidly discharge C3 until D5 conducts, after which G2 follows the collector voltage waveform to earth potential and the discharge passes to the next cathode. The momentary delay introduced by C3 causes the waveforms on G1 and G2 to overlap, and therefore prevents any tendency for the discharge to pass back to the original cathode at the end of the pulse on G1 rather than passing on to G2. C3 is connected to the transistor base rather than to earth in order to provide additional positive feedback in the blocking oscillator circuit, thus increasing its sensitivity and speeding up the pulse edges.

To reset the circuit the switch SW1 is opened momentarily, which allows the potentials of G1, G2 and the cathodes K2 to rise towards 400 v. as a result of leakage currents in the tube E. As a result the discharge settles on K1, which is still held at —30 v. When SW1 is again closed, the cathodes K2 are again taken to —30 v. and the guides to 0 v. and a negative pulse is applied to the transistor base via D5 and C3 which triggers the circuit and moves the discharge on to the following cathode, which is the "zero" cathode in this circuit. The advantage of using the cathode following K1 as the "zero" cathode (instead of K1 itself as is the usual practice), is that the output from K1 is a negative step occurring simultaneously with the leading edge of tenth input trigger pulse, and not (as is usual) a positive step coinciding with the end of the tenth switching pulse applied to G2. The effect is to reduce jitter due to uncertainties in the switching pulse widths. A condenser C4 and a resistor R6 are connected across S1 to suppress any spurious pulses due to contact bounce.

The negative output step from K2 may be used to trigger the transistor driving a further similar Dekatron scaling tube stage, the resetting circuit being common to both stages.

In the circuit of Fig. 3 the width of the blocking oscillator pulse is controlled by an inductance L4, shunted by a diode D8 and a resistor R7, one end of which is connected to the cathode of D2 and through a resistor R8 and the winding L2 to a potential of +2 v., and the other end of which is also connected to a potential of +2 v. Initially there is no current flowing in the inductance L4. When the transistor S is turned on by an input pulse, the voltage at the cathode of D2 falls instantaneously from +2 v. to about —1 v., so that a current builds up in L4. When this current becomes almost equal to the current flowing in R8, the base current tends to zero and the transistor turns off. D8 and R7 are provided to suppress the overshoot voltage on L4 when the transistor turns off.

The circuits of Figs. 1 and 3 can alternatively be triggered by means of positive pulses applied to the emitter.

Suitable component valves for the circuit of Fig. 1 are

| | |
|---|---|
| R1 | 2Mω |
| R2 | 10Kω |
| R3 | 47Kω |
| C1 | 0.1μf. |
| C2 | 0.01μf. |
| C3 | 470 pf. |
| S | OC72 |
| D1—D4 | CV448 |
| D5, D6 | GJ3D |

giving a transistor conduction time of about 80 μsec.

The blocking oscillator circuits of Figs. 1 and 3 (i.e. omitting C2, L3, etc.) have other applications as trigger circuits providing collector output pulses of well defined length.

I claim:

1. A circuit for driving a Dekatron scaling tube comprising a blocking oscillator circuit including a transistor having an emitter, a base and a collector, said emitter and base being hereinafter designated control electrodes, a transformer having three windings, two of said windings being connected to provide feedback between said collector and one control electrode and the third winding having first and second ends, a Dekatron scaling tube having first and second guide systems and a plurality of cathodes including an output cathode, connections between said first end and said first guide system and between said second end and said second guide system, a first diode connected between said first end and a fixed potential, a second diode connected between said second end and a fixed potential, and a condenser connected between said first end and a substantially fixed potential, whereby first and second consecutive negative switching pulses are generated in said third winding and are applied to said first and second guide systems respectively when said blocking oscillator is triggered, the said first end being held momentarily at the negative potential of said first switching pulse when the potential across said third winding reverses.

2. A circuit as claimed in claim 1 wherein the one said control electrode is the base and the duration of said switching pulses is determined by the time-constant of a condenser and a resistor connected in series in the base circuit of said transistor, the current flowing in said resistor substantially constituting the base current of the transistor.

3. A circuit as claimed in claim 1, wherein the one said control electrode is the base and the duration of said switching pulses is determined by an inductance connected between the base and a positive potential.

4. A circuit as claimed in claim 1 wherein the one said control electrode is the base and said condenser is connected between said first end and the base.

5. A circuit as claimed in claim 4 having a resetting circuit comprising switch means for momentarily disconnecting the cathodes other than the output cathode of said Dekatron from a second fixed potential and said first and second diodes from said fixed potentials, whereby leakage currents in said Dekatron cause the guide systems and said cathodes to rise from their normal running potentials to potentials so far above that of the output cathode that the Dekatron discharge passes to said output cathode, and whereby when the switch means are reclosed said guide systems and cathodes are returned to said running potentials and the circuit is triggered, the Dekatron discharge passing to the next adjacent cathode.

6. A blocking oscillator trigger circuit comprising a transistor having an emitter, a base and a collector, a transformer having at least two windings, connections from said windings to the base and collector respectively to provide positive feedback therebetween, a condenser included in the connection between the base and said winding, and a resistor connected in series with said condenser whereby the base current charges said condenser through said resistor when the transistor conducts, the time-constant of said condenser and resistor thereby determining the duration of the output pulse from said oscillator.

7. A blocking oscillator trigger circuit comprising a transistor having an emitter, a base and a collector, a transformer having at least two windings, connections from said windings to the base and collector respectively to provide positive feedback therebetween, and an inductance connected between the base and a positive potential to control the duration of the output pulse from said oscillator.

References Cited in the file of this patent

UNITED STATES PATENTS

| | | |
|---|---|---|
| 2,714,179 | Thomas | July 26, 1955 |
| 2,740,921 | Hough | Apr. 3, 1956 |
| 2,816,250 | Acton | Dec. 10, 1957 |
| 2,823,336 | Crowther | Feb. 11, 1958 |